(12) United States Patent
Sepulveda

(10) Patent No.: US 7,011,376 B2
(45) Date of Patent: Mar. 14, 2006

(54) SYSTEMS AND METHODS FOR PROPELLING A VEHICLE

(76) Inventor: Richard J. Sepulveda, 1911 Lockwood Ave., Fremont, CA (US) 94536

( * ) Notice: Subject to any disclaimer, the term of this patent is extended or adjusted under 35 U.S.C. 154(b) by 126 days.

(21) Appl. No.: 10/647,195

(22) Filed: Aug. 25, 2003

(65) Prior Publication Data
US 2005/0046269 A1 Mar. 3, 2005

(51) Int. Cl.
*B60B 37/00* (2006.01)

(52) U.S. Cl. .................. 301/2.5; 301/110.5; 301/124.1; 280/252; 280/253

(58) Field of Classification Search .............. 280/252, 280/253, 255, 2.5, 6.9, 110.5; 301/73, 77, 301/78, 124.1, 124.2
See application file for complete search history.

(56) References Cited

U.S. PATENT DOCUMENTS

| | | | |
|---|---|---|---|
| 636,184 A | 10/1899 | Roxendorff | |
| 3,834,733 A | 9/1974 | Harris | |
| 3,954,282 A | 5/1976 | Hege | |
| 4,005,611 A | * 2/1977 | Jeffries | 74/416 |
| 4,227,712 A | * 10/1980 | Dick | 280/236 |
| 4,630,839 A | 12/1986 | Seol | |
| 4,666,173 A | 5/1987 | Graham | |
| 4,880,249 A | 11/1989 | Gray et al. | |
| 5,242,181 A | * 9/1993 | Fales et al. | 280/251 |
| 5,335,927 A | * 8/1994 | Islas | 280/255 |
| 5,785,337 A | 7/1998 | Ming | |
| 5,876,053 A | * 3/1999 | Ray | 280/252 |
| 5,988,662 A | 11/1999 | Staehlin | |
| 6,340,067 B1 | * 1/2002 | Fujiwara et al. | 180/206 |
| 2003/0025293 A1 | * 2/2003 | Drew | 280/253 |

* cited by examiner

Primary Examiner—Frantz F. Jules

(74) Attorney, Agent, or Firm—Jackson Patent Law Office

(57) ABSTRACT

Disclosed are systems and methods for converting linear motion into circular motion.

37 Claims, 11 Drawing Sheets

SYSTEMS AND METHODS FOR PROPELLING A VEHICLE

BACKGROUND OF THE INVENTION

1. Field of the Invention

This invention relates generally to vehicle propulsion systems and, more particularly, to systems and methods of converting linear motion into circular motion.

2. Description of Related Art

A typical bicycle propulsion mechanism includes a sprocket wheel driven by rotating pedal cranks and coupled by a chain to a rear sprocket mounted concentrically with the hub of the rear wheel of the bicycle. This mechanism does not provide a uniform conversion of the force, exerted by the rider, into torque. At the top and bottom of pedal travel, torque is minimal and reaches a maximum value at the midpoint of downward travel of each pedal. In other words, rotational movement results in a varying torque from zero, to a maximum, and back again to zero, for each half revolution. This variation in torque results in a variation in pedal resistance experienced by the rider.

SUMMARY OF THE INVENTION

It is an object of the present invention to provide systems and methods for propelling a vehicle and giving the rider a more uniform pedal resistance.

To achieve this and other objects of the present invention, an apparatus comprises a wheel configured to rotate; a surface; a first member, the first member being coupled to the wheel at a first time when the first member moves in a first direction on the surface; and a second member configured to apply a force to the first member, the surface having an incline relative to a direction of movement of the second member.

According to another aspect of the present invention, there is a method for a system having a first member, a wheel and a surface. The method comprises coupling the first member to the wheel at a first time when the first member moves in a first direction on the surface; and applying a force to the first member, the surface having an incline relative to a component of the force.

According to yet another aspect of the present invention, a system comprises a first member; a wheel; a surface; means for coupling the first member to the wheel at a first time when the first member moves in a first direction on the surface; and means for applying a force to the first member, the surface having an incline relative to a component of the force.

The accompanying drawings which are incorporated in and which constitute a part of this specification, illustrate embodiments of the invention and, together with the description, explain the principles of the invention, and additional advantages thereof. Certain drawings are not necessarily to scale, and certain features may be shown larger than relative actual size to facilitate a more clear description of those features. Certain drawings may be relatively abstract, omitting certain features to promote clarity or simplicity of description. Throughout the drawings, corresponding parts are labeled with corresponding reference numbers.

DESCRIPTION OF THE PREFERRED EMBODIMENTS

First Preferred Embodiment

Figure 1:
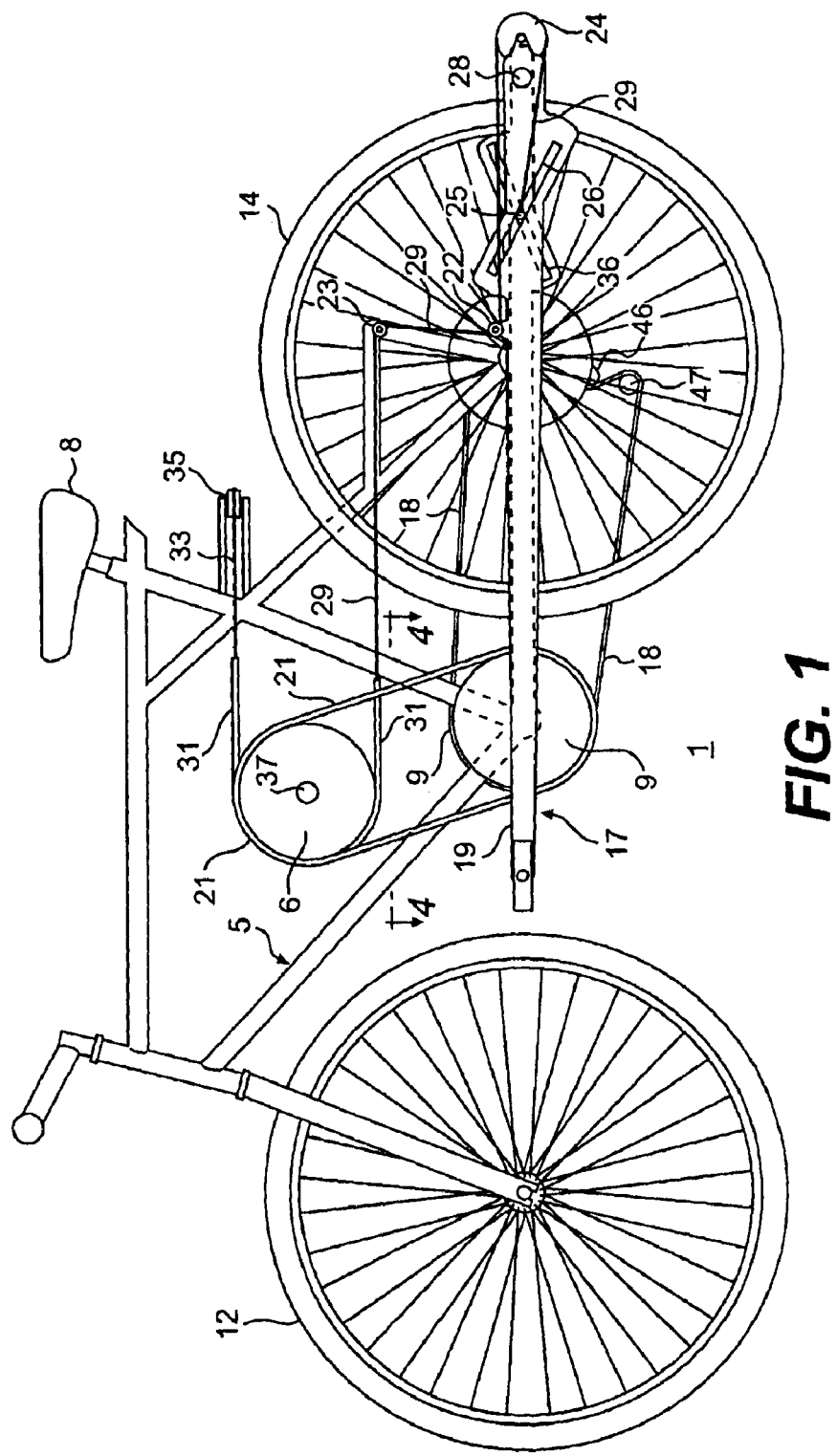
FIG. 1 is a side view of a bicycle with a drive mechanism in accordance with a first preferred embodiment of the present invention.
Figure 2:
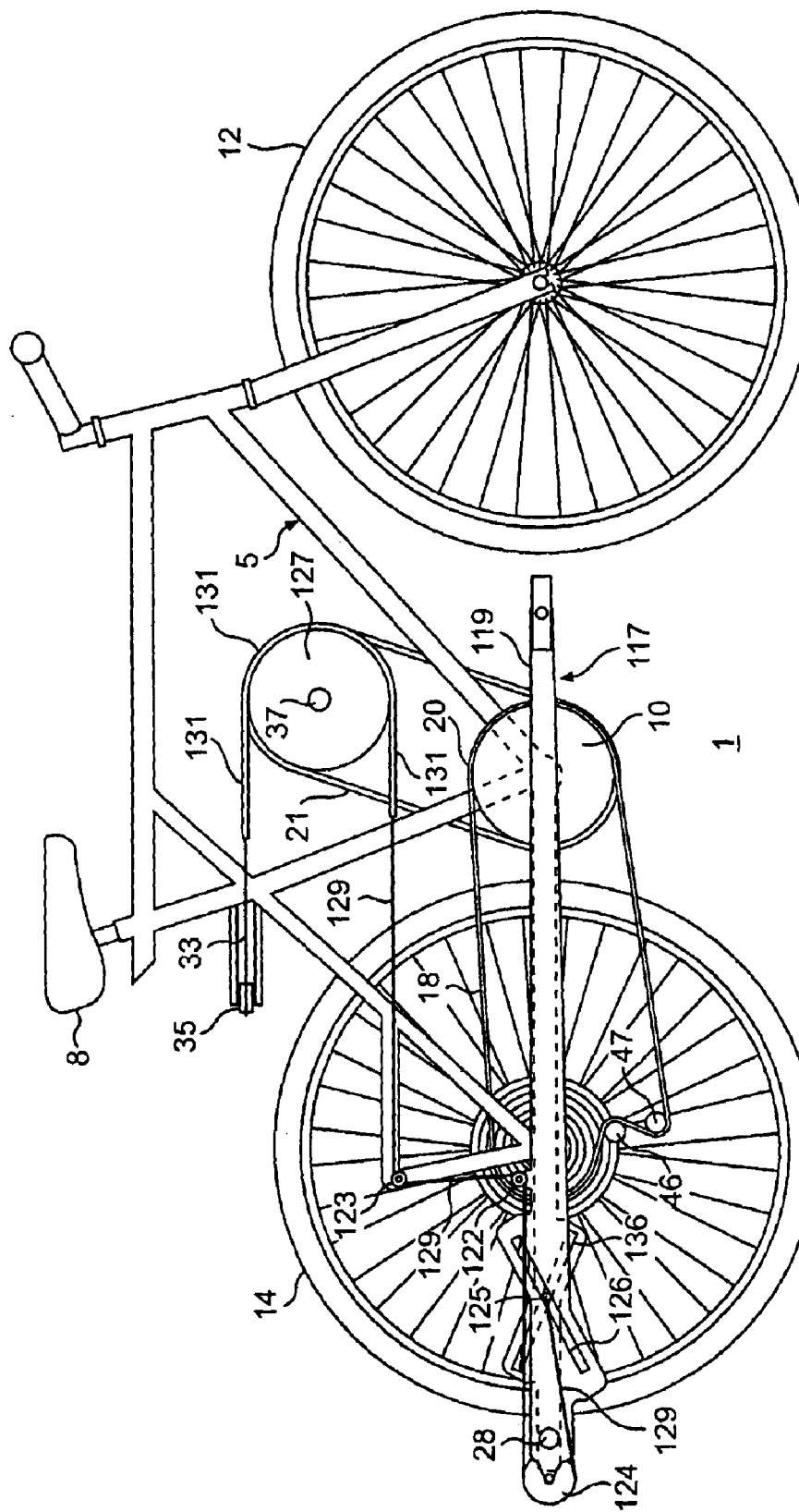
FIG. 2 is an opposite side view of the first preferred bicycle.
Figure 3:
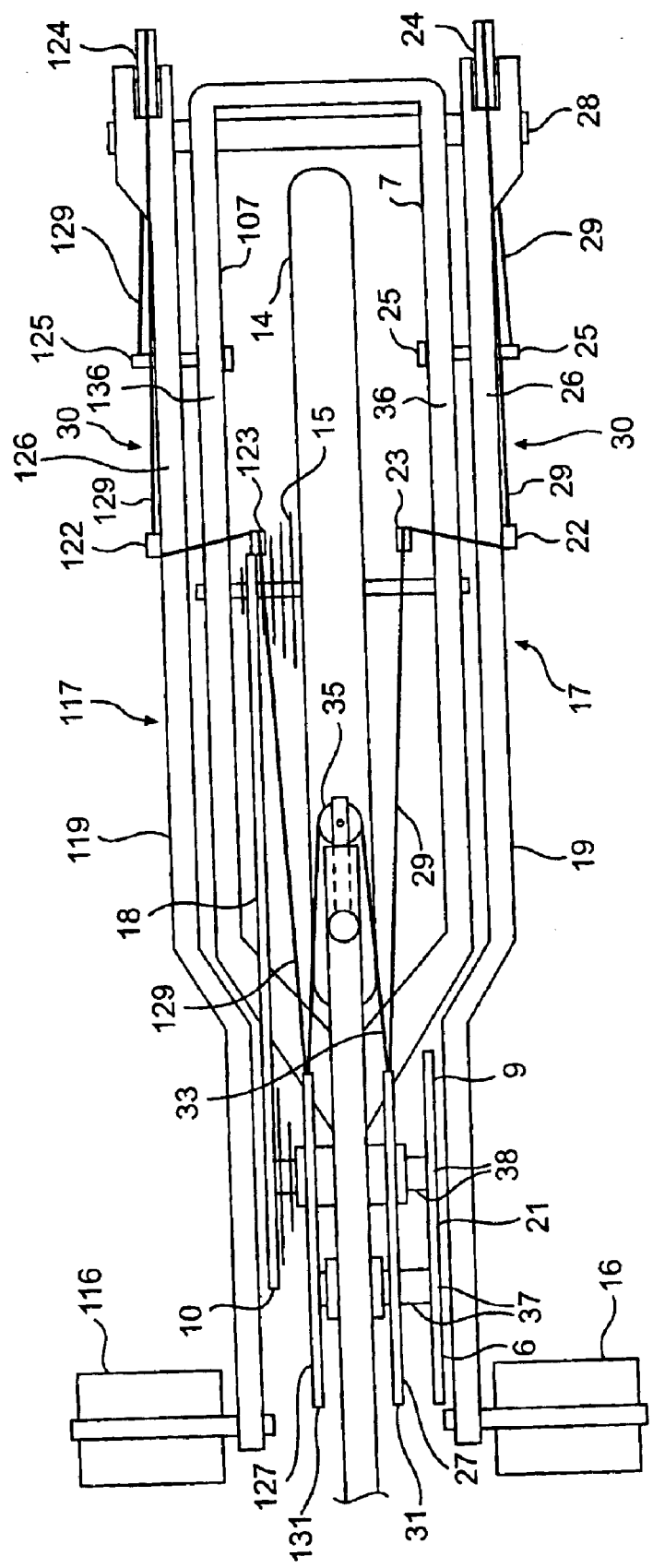
FIG. 3 is a partial top view corresponding to FIGS. 1 and 2.

FIG. 1 shows a side view of bicycle 1 having a drive mechanism for converting oscillatory motion of pedals 16 and 116 into rotation of rear wheel 14. FIG. 2 shows an opposite side view of bicycle 1. FIG. 3 shows a partial top view of bicycle 1, while omitting seat 8 for clarity of description.

Bicycle 1 includes frame 5 with holding bars 7 and 107 rotatably supporting rear wheel 14. Wheel sprocket 15 engages wheel 14. Sprocket 15 includes a slip clutch mechanism so that forward rotation of the sprocket 15 forces at least equal rotation of the wheel 14, while allowing independent rotation of wheel 14 that is greater than that of sprocket 15.

Left sprocket 9 and right sprocket 10 are mounted on primary drive shaft 38.

Chain 18 is entrained around right sprocket 10, sprocket 15, sprocket 46, and sprocket 47. Thus, wheel sprocket 15 is engaged through drive chain 18 with right sprocket 10.

The left part of the drive mechanism operates reciprocally with the right part of the drive mechanism, so that the left pedal assembly 17 is in the upper position when the right pedal assembly 117 is in the lower position, and vice versa, as described in more detail below.

Left pedal assembly 17 includes 38-inch pedal lever 19 and a pedal 16 attached to left pedal lever 19.

Pedal lever 19 defines channel 26. Frame 5 defines channel 36. Pin 25 rides in both channel 26 and channel 36. Thus, when pedal lever 19 is raised to its maximum, pin 25 is in the rear position of channel 26 and the rear position of channel 36. As the rider presses pedal lever 19 down, pin 25 is forced forward in channel 26, and is forced forward in channel 36.

Figure 8:
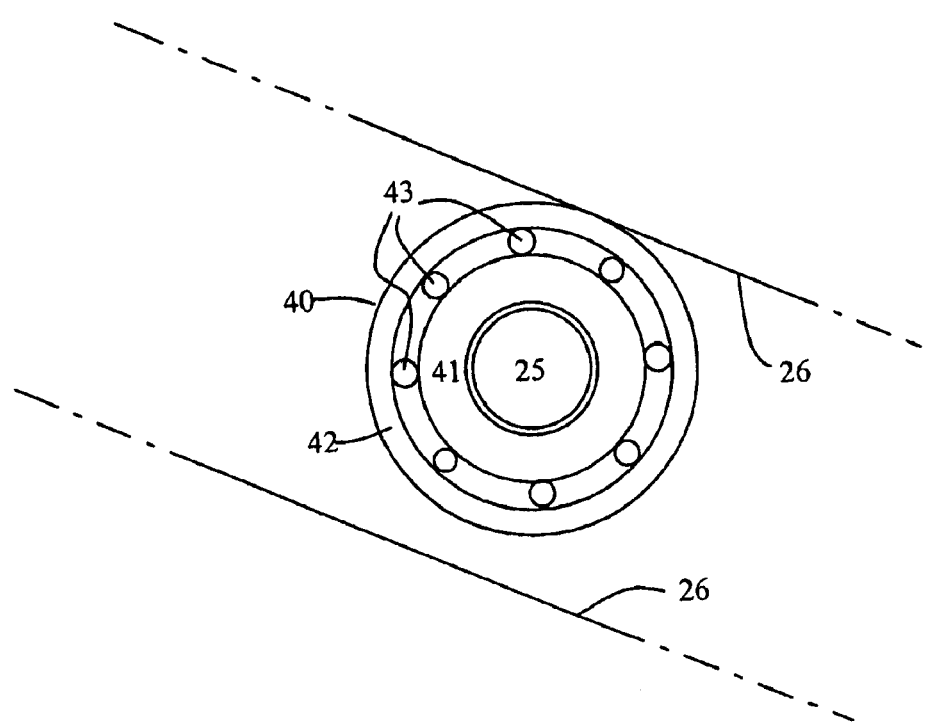
FIG. 8 is a diagram for describing movement between certain pieces of the left part.
Figure 9:
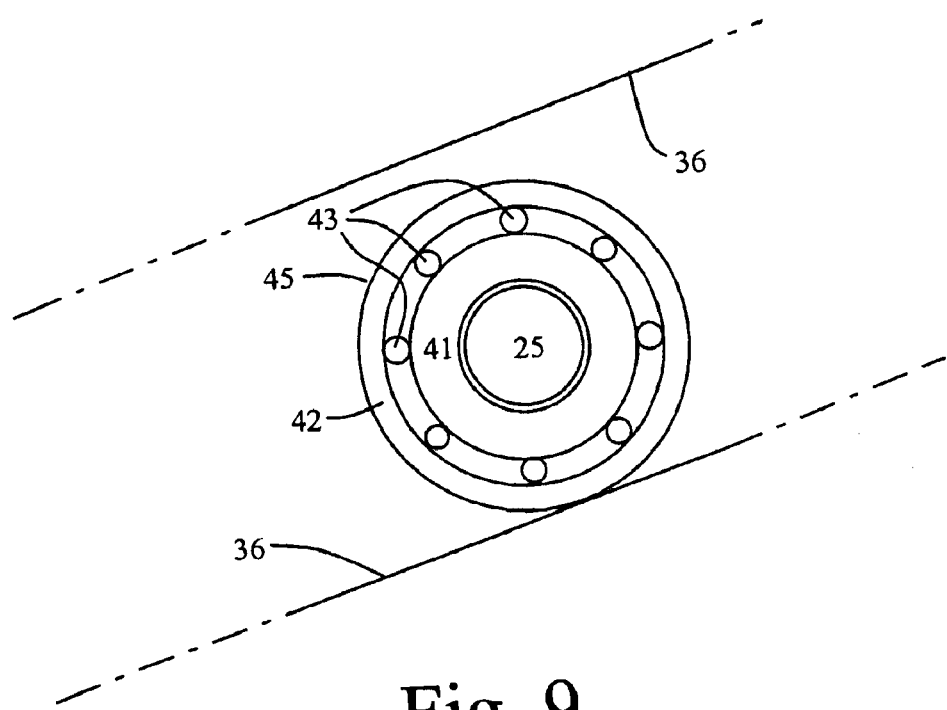
FIG. 9 is a diagram for describing movement between other pieces of the left part.

Thus, as apparent in FIGS. 1, 8 and 9, for example, a lower surface of channel 36 is essentially at an incline relative to the vertical direction of movement of lever 19; a component of the force from lever 19 is normal to the lower surface of channel 36.

Pin 25 is attached to an end of cable assembly 30. Cable assembly 30 extends around left rear guide pulley 24 and left tension pulley 22. Thus, when the rider presses down on lever 19, via pedal 16, tension is transferred up left guide pulley 23 then to the bottom of left sprocket 27.

Sprocket 27 is rotatably mounted on shaft 37 via any variety of conventional or unconventional mechanisms for selectively engaging sprocket 27 with shaft 37. From the perspective of FIG. 1, the mechanism acts to engage sprocket 27 with shaft 37 when sprocket 27 rotates in a counterclockwise direction; and the mechanism acts to disengage sprocket 27 from shaft 37 when sprocket 27 rotates in a clockwise direction.

Sprocket 127 has teeth engaged with chain 131 of cable assembly 30.

Sprocket 127 is rotatably mounted on shaft 37 via any variety of conventional or unconventional mechanisms for selectively engaging sprocket 127 with shaft 37. From the perspective of FIG. 1, the mechanism acts to engage sprocket 127 with shaft 37 when sprocket 127 rotates in a counterclockwise direction; and the mechanism acts to disengage sprocket 127 from shaft 37 when sprocket 127 rotates in a clockwise direction.

Sprocket 127 has teeth engaged with chain 131 of cable assembly 30.

Cable assembly 30 runs along the front and upward over the top of left sprocket 27 causing it to turn sprocket 27 to engage the secondary drive shaft 37. Secondary drive shaft 37 drives left sprocket 9, via left outer sprocket 6 and chain 21, at a one to one ratio, allowing bicycle 1 to interface with conventional bicycle gearing. Thus, right sprocket 10 drives rear wheel 14 via chain 18, as described earlier in this Patent Application.

The tension is also transferred back to and around center guide pulley 35.

Center guide 35 pulley directs assembly 30 back to the top of the right sprocket 127 and down the front of the sprocket 127 and then back underneath, causing right sprocket 127 to turn in a clockwise direction. During this time, secondary drive shaft 37 is not engaged with right sprocket 127, enabling right sprocket 127 to spin freely on shaft 37.

Assembly 30 is then directed to the right guide pulley 123 then down to the right tension pulley 122 and back to the right rear guide pulley 124 and finally to the cable attachment on the right sliding pin 125. Thus, when the rider presses down on pedal lever 19, cable assembly 30 pulls right sliding pin 125 to the rear of channel 126 of pedal lever 119, causing pedal lever 119 to rise.

Next, as the rider presses pedal lever 119 down, pin 125 is forced forward in channel 126, and is forced forward in channel 136. Thus, when the rider presses down on lever 119, via pedal 116, tension is transferred up left guide pulley 123 then to the bottom of left sprocket 127. Cable assembly 30 runs along the front and upward over the top of left sprocket 127 causing it to turn sprocket 127 to engage the secondary drive shaft 37, and drive rear wheel 14 via left outer sprocket 6 and chain 21, left sprocket 9, primary drive shaft 38, right sprocket 10, and chain 18.

The tension is also transferred back to and around center guide pulley 35.

Center guide 35 pulley directs assembly 30 back to the top of the right sprocket 27 and down the front of the sprocket 27 and then back underneath, causing right sprocket 27 to turn in a clockwise direction. During this time, secondary drive shaft 37 is not engaged with right sprocket 27, enabling right sprocket 27 to spin freely on shaft 37.

Assembly 30 is then directed to the right guide pulley 23 then down to the right tension pulley 22 and back to the right rear guide pulley 24 and finally to the cable attachment on the right sliding pin 25. Thus, when the rider presses down on pedal lever 119, cable assembly 30 pulls right sliding pin 25 to the rear of channel 126 of pedal lever 19, causing pedal lever 19 to rise.

Figure 4:
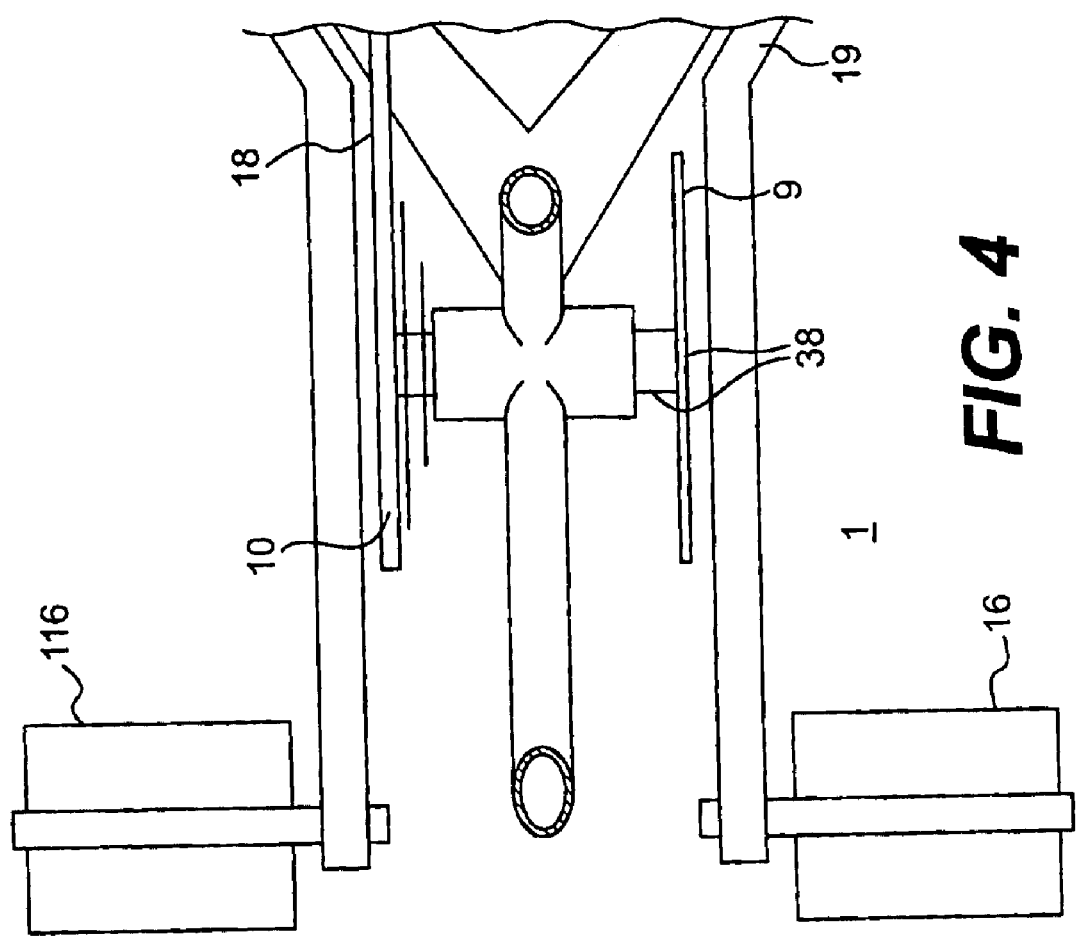
FIG. 4 is an enlarged, cutaway view taken along the line 4—4 in FIG. 1.

FIG. 4 is an enlarged, cutaway view taken along the line 4—4 in FIG. 1, while omitting chain 21.

Figure 5:
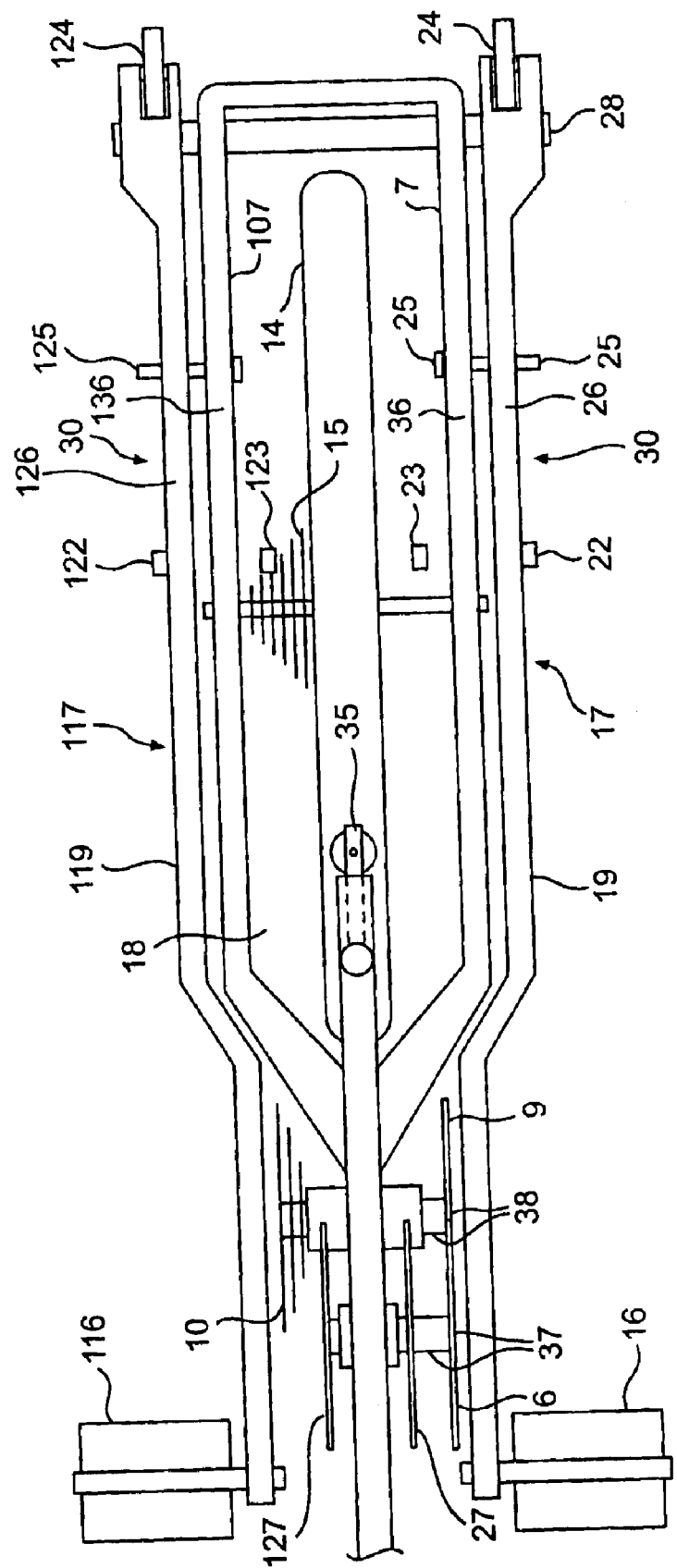
FIG. 5 is similar to FIG. 3, while omitting certain elements.

FIG. 5 is similar to FIG. 3, while omitting chain 21, chain 18, cable 29, chain 31, cable 33, chain 131, and cable 129. Thus sprockets 27, 127, and 10 appear bare. Thus sprockets 6 and 9 also appear bare, and a division between sprockets 6 and 9 is readily apparent.

Figure 6:
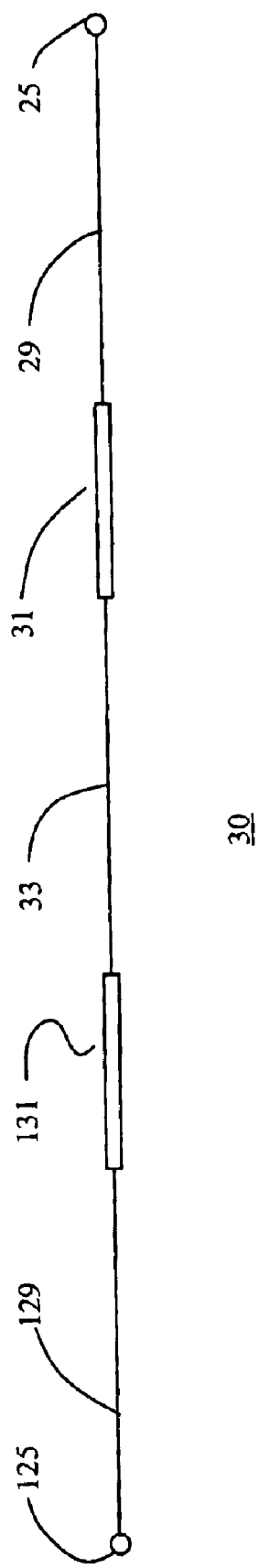
FIG. 6 is a diagram emphasizing a part of the first preferred mechanism.

FIG. 6 is a relatively abstract depiction of cable assembly 30, in an extended position for clarity. Cable 29 connects pin 25 to chain 31. Chain 31 is for engaging sprocket 27. Cable 33 connects chain 31 to chain 131. Cable 33 is for engaging with rear guide pulley 35. Chain 131 is for engaging with sprocket 127. Cable 129 connects chain 131 to pin 125.

In summary, shaft 37 drives wheel 14, via left outer sprocket 6 and chain 21, left sprocket 9, primary drive shaft 38, right sprocket 10, chain 18, and rear sprocket 15. Channel 26 defines a surface and pin 25 moves along the surface. Pin 25 is mounted in pedal assembly 17. Pedal assembly 17 is pivotally coupled to frame 5 via shaft 28.

From the perspective of FIG. 1, when sprocket 27 rotates counterclockwise, sprocket 27 is engaged to rotate shaft 37 counterclockwise with sprocket 27. Conversely, when sprocket 27 rotates clockwise, sprocket 27 rotates relative to shaft 37. In other words, when sprocket 27 rotates clockwise, sprocket 27 is not engaged to rotate shaft 37.

From the perspective of FIG. 1, when sprocket 127 rotates counterclockwise, sprocket 127 is engaged to rotate shaft 37 counterclockwise with sprocket 127. Conversely, when sprocket 127 rotates clockwise, sprocket 127 rotates relative to shaft 37. In other words, when sprocket 127 rotates clockwise, sprocket 127 is not engaged to rotate shaft 37.

It follows from the previous paragraphs that when cable assembly 30 moves in one direction, sprocket 27 is engaged to rotate shaft 37 and sprocket 127 rotates relative to shaft 37; and when cable assembly 30 moves in the opposite direction, sprocket 27 rotates relative to shaft 37 sprocket 127 is engaged to rotate shaft 37.

Frame 5 defines a left channel 36, and pedal assembly 17 defines a left channel 26. Pin 25 rides in both left channel 36 and left channel 26. (FIG. 1). In FIG. 3, positions of channels 26 and 36 are shown by reference numbers.

Figure 7:
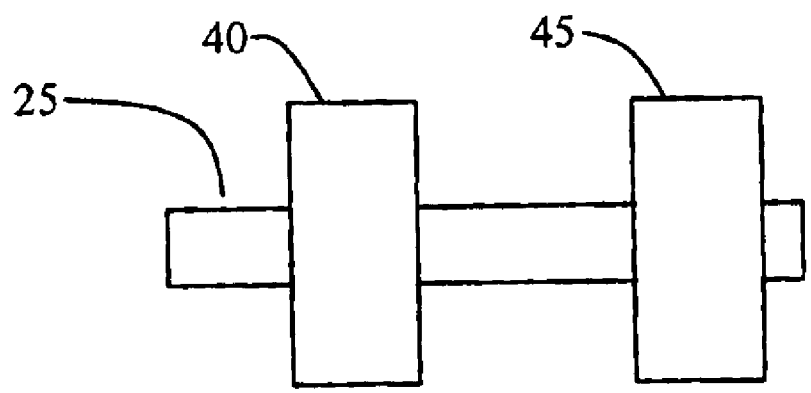
FIG. 7 is a diagram emphasizing a left part of the first preferred mechanism.

FIG. 7 in a plan view showing pin 25 mounted in bearing 40 and in bearing 45. Bearing 40 is between pin 25 and channel 26, thus providing a low friction interface between pin 25 and channel 26. Bearing 45 is between pin 25 and channel 36, thus providing a low friction interface between pin 25 and channel 36.

FIG. 8 is an enlarged side view, from the perspective of FIG. 1, showing pin 25, channel 26, and bearing 40. Bearing 40 includes an inner ring 41, an outer ring 42, and a plurality of balls 43 between inner ring 41 and outer ring 42. A lubricant is enclosed between inner ring 41 and outer ring 42.

FIG. 9 is an enlarged side view, from the perspective of FIG. 1, showing pin 25, channel 36, and bearing 45. Bearing 45 includes an inner ring 41, an outer ring 42, and a plurality of balls 43 between inner ring 41 and outer ring 42.

At the common time depicted in FIGS. 8 and 9, pedal lever 19 is being pressed down, causing bearing 40 to roll along the top surface of channel 26 while clearing the bottom surface of channel 26, and causing bearing 45 to roll along the bottom surface of channel 36 while clearing the top surface of channel 36. Conversely, when pedal lever 19 is moving up, bearing 40 rolls along the bottom surface of channel 26, while clearing the top surface of channel 26.

Frame 5 defines a right channel 136, and pedal assembly 117 defines a right channel 126. Pin 125 rides in both right channel 136 and right channel 126. (FIG. 2). In FIG. 3, positions of channels 126 and 136 are shown by reference numbers.

Figure 10:
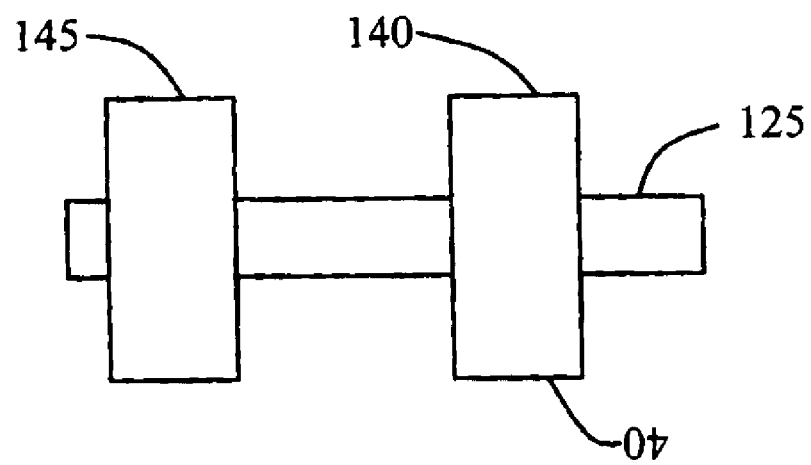
FIG. 10 is a diagram emphasizing a right part of the first preferred mechanism.

FIG. 10 in a plan view showing pin 125 mounted in bearing 140 and in bearing 145.

Figure 11:
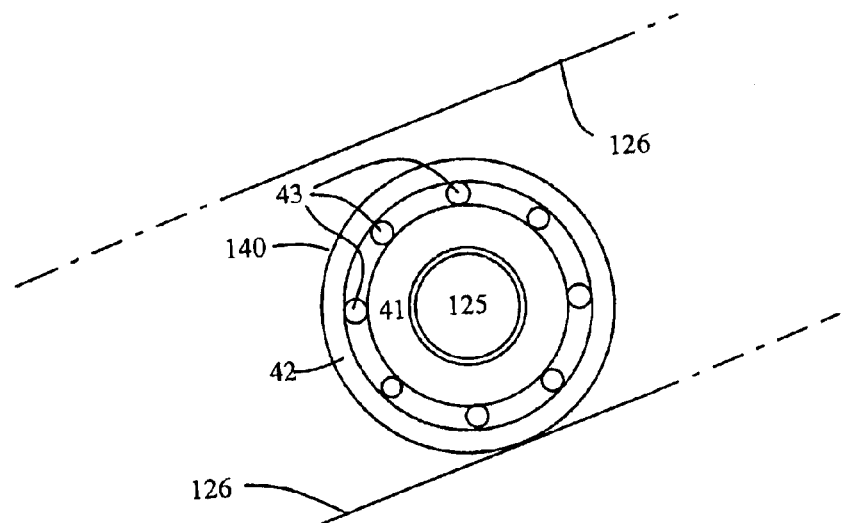
FIG. 11 is a diagram for describing movement between certain pieces of the right part.

FIG. 11 is an enlarged side view, from the perspective of FIG. 2, showing pin 125, channel 126, and bearing 140. Bearing 140 includes an inner ring 41, an outer ring 42, and a plurality of balls 43 between inner ring 41 and outer ring 42.

Figure 12:
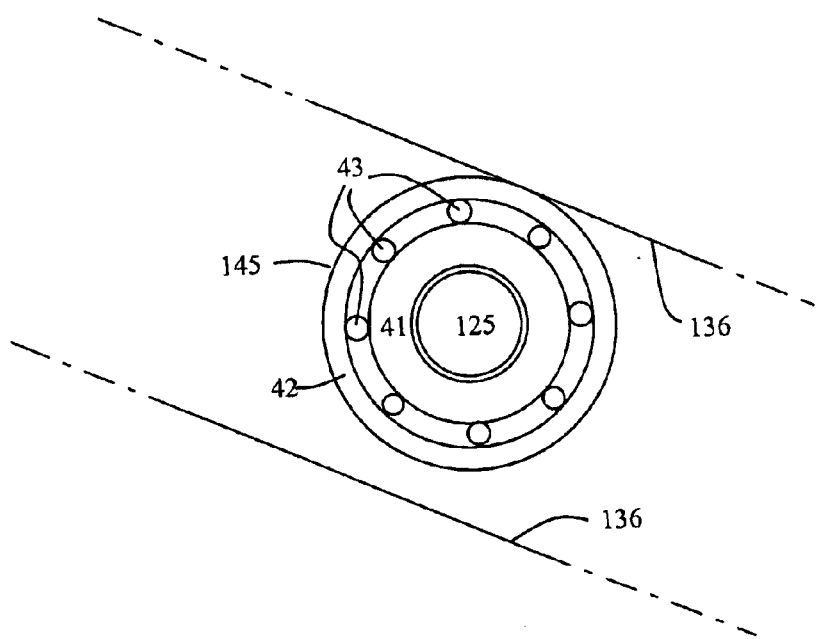
FIG. 12 is a diagram for describing movement between other pieces of the right part.

FIG. 12 is an enlarged side view, from the perspective of FIG. 2, showing pin 125, channel 136, and bearing 145. Bearing 145 includes an inner ring 41, an outer ring 42, and a plurality of balls 43 between inner ring 41 and outer ring 42.

The time depicted in FIGS. 11 and 12 is the same as that depicted in FIGS. 8 and 9. At this common time, pedal lever 119 is moving up, causing bearing 140 to roll along the bottom surface of channel 126 while clearing the bottom surface of channel 126, and causing bearing 145 to roll along the top surface of channel 136 while clearing the bottom surface of channel 126.

Figure 13:
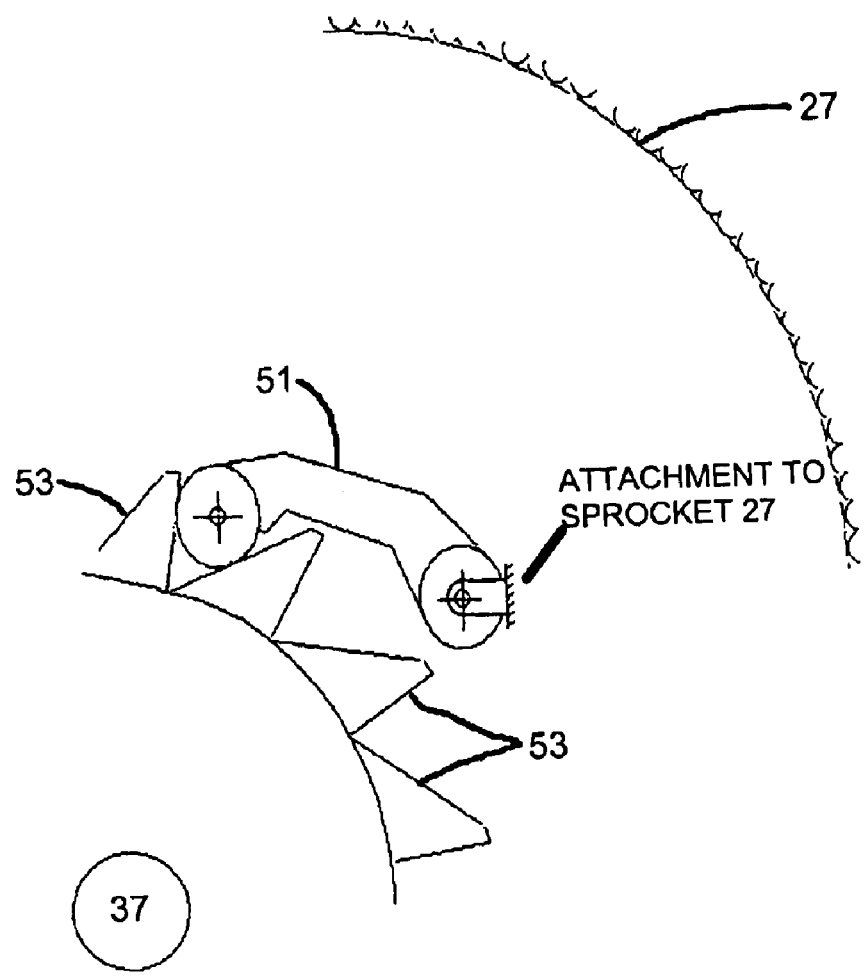
FIG. 13 is an example of a type of mechanism that could be used in the first preferred bicycle.

FIG. 13 shows an example of a type of ratchet or clutch mechanism that could be used to couple sprocket 27 to shaft 37. Pawl, or hinged catch, 51 is attached to sprocket 27. Pawl 51 engages sloping teeth 53 of shaft 37, thereby inhibiting motion in one direction while permitting motion in the opposite direction. Thus, from the perspective of FIG. 1, sprocket 27 is engaged with shaft 37 when sprocket 27 rotates in a counterclockwise direction; and sprocket 27 is disengaged from shaft 37 when sprocket 27 rotates in a clockwise direction.

Figure 14:
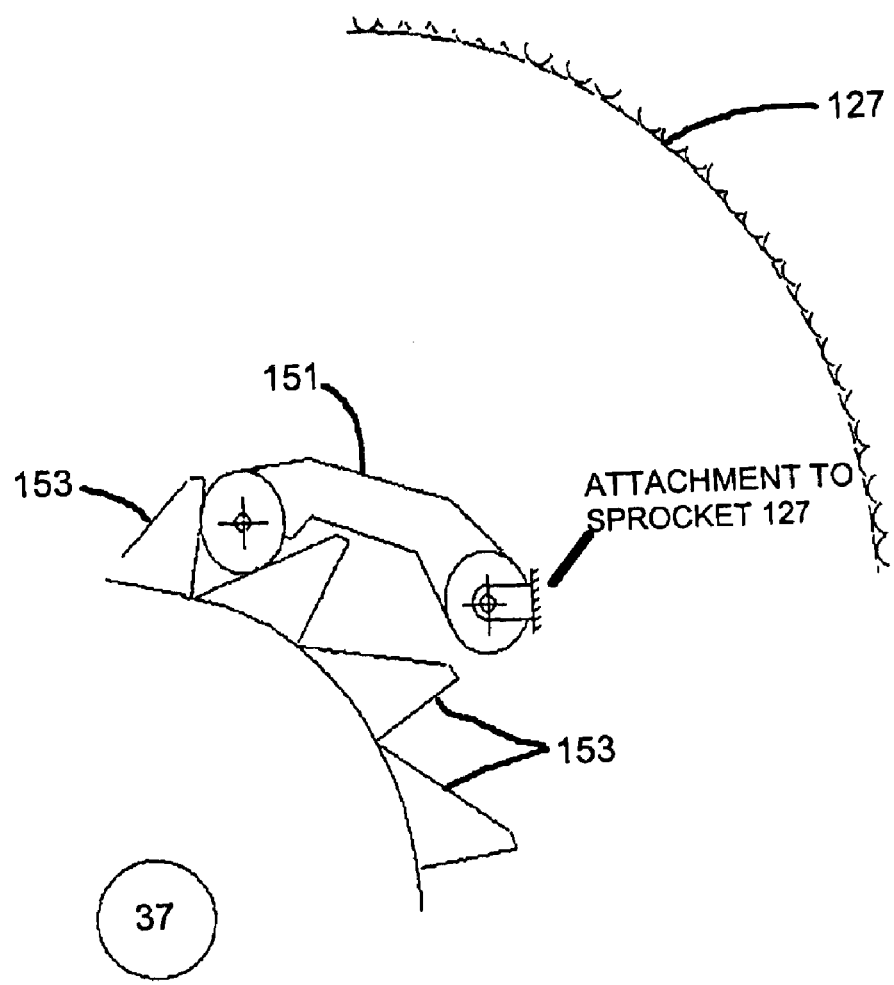
FIG. 14 is another example of the type of mechanism that could be used in the first preferred bicycle.

FIG. 14 shows an example of a type of ratchet or clutch mechanism that could be used to couple sprocket 127 to shaft 37. Pawl, or hinged catch, 151 is attached to sprocket 127. Pawl 151 engages sloping teeth 153 of shaft 37, thereby inhibiting motion in one direction while permitting motion in the opposite direction. Thus, from the perspective of FIG. 1, sprocket 127 is engaged with shaft 37 when sprocket 127 rotates in a counterclockwise direction; and sprocket 127 is disengaged from shaft 37 when sprocket 127 rotates in a clockwise direction.

Benefits, other advantages, and solutions to problems have been described above with regard to specific examples. The benefits, advantages, solutions to problems, and any element(s) that may cause any benefit, advantage, or solution to occur or become more pronounced are not critical, required, or essential feature or element of any of the claims.

Additional advantages and modifications will readily occur to those skilled in the art. For example, in an alternate embodiment, instead of sprockets 27 and 127 being on a secondary drive shaft, such sprockets are on primary drive shaft 38, thereby eliminating the need for such a secondary drive shaft.

Thus, the invention in its broader aspects is therefore not limited to the specific details, representative systems and methods, and illustrative examples shown and described. Accordingly, departures may be made from such details without departing from the spirit or the scope of Applicants' general inventive concept. The invention is defined in the following claims. In general, the words "first," "second," etc., employed in the claims do not necessarily denote an order.

What is claimed is:

1. An apparatus comprising:
   a wheel configured to rotate;
   a surface;
   a first ratchet;
   a first member, the first member configured to apply force to the wheel, via the ratchet, at a first time when the first member moves in a first direction on the surface; and
   a second member configured to apply a force to the first member, the surface having an incline relative to a direction of movement of the second member.

2. The apparatus of claim 1 wherein the first member includes a pin.

3. The apparatus of claim 1 further including a second ratchet, wherein the second ratchet is coupled to the wheel when the first member moves in a second direction on the surface.

4. The apparatus of claim 3 wherein the first and second ratchets rotate about a common axis.

5. The apparatus of claim 1 wherein the wheel rotates about a first axis and the first ratchet rotates about a second axis.

6. The apparatus of claim 1 wherein the wheel rotates about a first axis and the first ratchet rotates about a second axis, and the second axis is coupled to the first axis via a third axis.

7. The apparatus of claim 1 wherein the wheel rotates about a first axis and the first and second ratchets rotate about a second axis.

8. The apparatus of claim 1 wherein the wheel rotates about a first axis and the first and second ratchets rotate about a second axis, and the second axis is coupled to the first axis via a third axis.

9. The apparatus of claim 1 further including a longitudinal member coupled to the first member, first ratchet, and second ratchet.

10. The apparatus of claim 1 further including
    a second surface;
    a third member, the third member configured to apply force to the wheel at a second time when the first member moves in a second direction on the first surface.

11. The apparatus of claim 10 further including a pedal configuration engaged with the third member, wherein the pedal configuration includes a proximal part pivotally engaged with a bicycle frame, and a distal part for receiving pressure from a foot.

12. A method for a system having a first member, a first ratchet, a wheel and a surface, the method comprising:
    applying force from the first member to the wheel, via the first ratchet, at a first time when the first member moves in a first direction on the surface; and
    applying a force to the first member, the surface having an incline relative to a component of the force.

13. The method of claim 12 wherein the first member includes a pin.

14. The method of claim 12 wherein the system includes a second ratchet, and the method further includes coupling the second ratchet to the wheel when the first member moves in a second direction on the surface.

15. The method of claim 12 further including rotating the first and second ratchets about a common axis.

16. The method of claim 12 further including rotating the wheel about a first axis and the first ratchet about a second axis.

17. The method of claim 12 further including rotating the wheel about a first axis and the first ratchet about a second axis, and coupling the second axis to the first axis via a third axis.

18. The method of claim 12 further including rotating the wheel about a first axis and the first and second ratchets rotate about a second axis.

19. The method of claim 12 further including rotating the wheel about a first axis and the first and second ratchets rotate about a second axis, and coupling the second axis to the first axis via a third axis.

20. The method of claim 12 further including coupling to the first member, first ratchet, and second ratchet, via a longitudinal member.

21. The method of claim 12 wherein the system further includes a second surface, and a second member that moves on the second surface, and the method further includes applying force from the second member to the wheel at a second time when the first member moves in a second direction on the first surface.

22. The method of claim 12 wherein the system further includes a bicycle frame supporting the wheel, a pedal configuration having a proximal part pivotally engaged with the bicycle frame, and a distal part for receiving pressure from a foot, and applying force to the first member includes engaging the pedal configuration with the first member.

23. A system comprising:
   a first member;
   a wheel;
   a surface;
   a first ratchet;
   means for applying force from the first member to the wheel, via the ratchet, at a first time when the first member moves in a first direction on the surface; and
   means for applying a force to the first member, the surface having an incline relative to a component of the force.

24. The system of claim 23 wherein the first member includes a pin.

25. The system of claim 23 further including a second ratchet and means for coupling the second ratchet to the wheel when the first member moves in a second direction on the surface.

26. The system of claim 23 further including means for rotating the first and second ratchets about a common axis.

27. The system of claim 23 further including means for rotating the wheel about a first axis and the first ratchet about a second axis.

28. The system of claim 23 further including means for rotating the wheel about a first axis and the first ratchet about a second axis, and means for coupling the second axis to the first axis via a third axis.

29. The system of claim 23 further including means for rotating the wheel about a first axis and the first and second ratchets rotate about a second axis.

30. The system of claim 23 further including means for rotating the wheel about a first axis and the first and second ratchets rotate about a second axis, and means for coupling the second axis to the first axis via a third axis.

31. The system of claim 23 further means for coupling to the first member, first ratchet, and second ratchet, via a longitudinal member.

32. A system comprising:
   a first member;
   a wheel;
   a surface;
   means for applying force from the first member to the wheel at a first time when the first member moves in a first direction on the surface;
   means for applying force to the first member, the surface having an incline relative to a component of the force; and
   a second surface, and a third member, and the method further includes means for coupling to the wheel at a second time when the first member moves in a second direction on the first surface.

33. A system comprising:
   a first member;
   a wheel;
   a surface;
   means for applying force from the first member to the wheel at a first time when the first member moves in a first direction on the surface;
   means for applying force to the first member, the surface having an incline relative to a component of the force; and
   a pedal configuration having a proximal part pivotally engaged with a bicycle frame, and a distal part for receiving pressure from a foot, and means for engaging the pedal configuration with the third member.

34. An apparatus comprising:
   a wheel configured to rotate;
   a surface;
   a first member, the first member configured to apply force to the wheel at a first time when the first member moves in a first direction on the surface;
   a second member configured to apply force to the first member, the surface having an incline relative to a direction of movement of the second member;
   a second surface; and
   a third member, the third member configured to apply force to the wheel at a second time when the first member moves in a second direction on the first surface.

35. An apparatus comprising:
   a wheel configured to rotate;
   a first ratchet;
   a first longitudinal member configured to apply force to the wheel, via the first ratchet, at a first time;
   a second ratchet; and
   a second longitudinal member configured to apply force to the wheel, via the second ratchet, at a second time.

36. A method for a system having a wheel configured to rotate, a first ratchet, a second ratchet, a first longitudinal member, and a second longitudinal member, the method comprising:
   applying force from the first longitudinal member to the wheel, via the first ratchet, at a first time; and
   applying force from the second longitudinal member to the wheel, via the second ratchet, at a second time.

37. A system comprising:
   a wheel configured to rotate;
   a first ratchet;
   a second ratchet;
   a first longitudinal member:
   a second longitudinal member;
   means for applying force from the first longitudinal member to the wheel, via the first ratchet, at a first time; and
   means for applying force from the second longitudinal member to the wheel, via the second ratchet, at a second time.

* * * * *